Oct. 19, 1943.  W. G. HOELSCHER  2,332,381
LATHE SPINDLE SPEED CONTROL
Filed Nov. 23, 1940  5 Sheets—Sheet 1

INVENTOR.
William G. Hoelscher
BY Wood & Wood ATTORNEYS

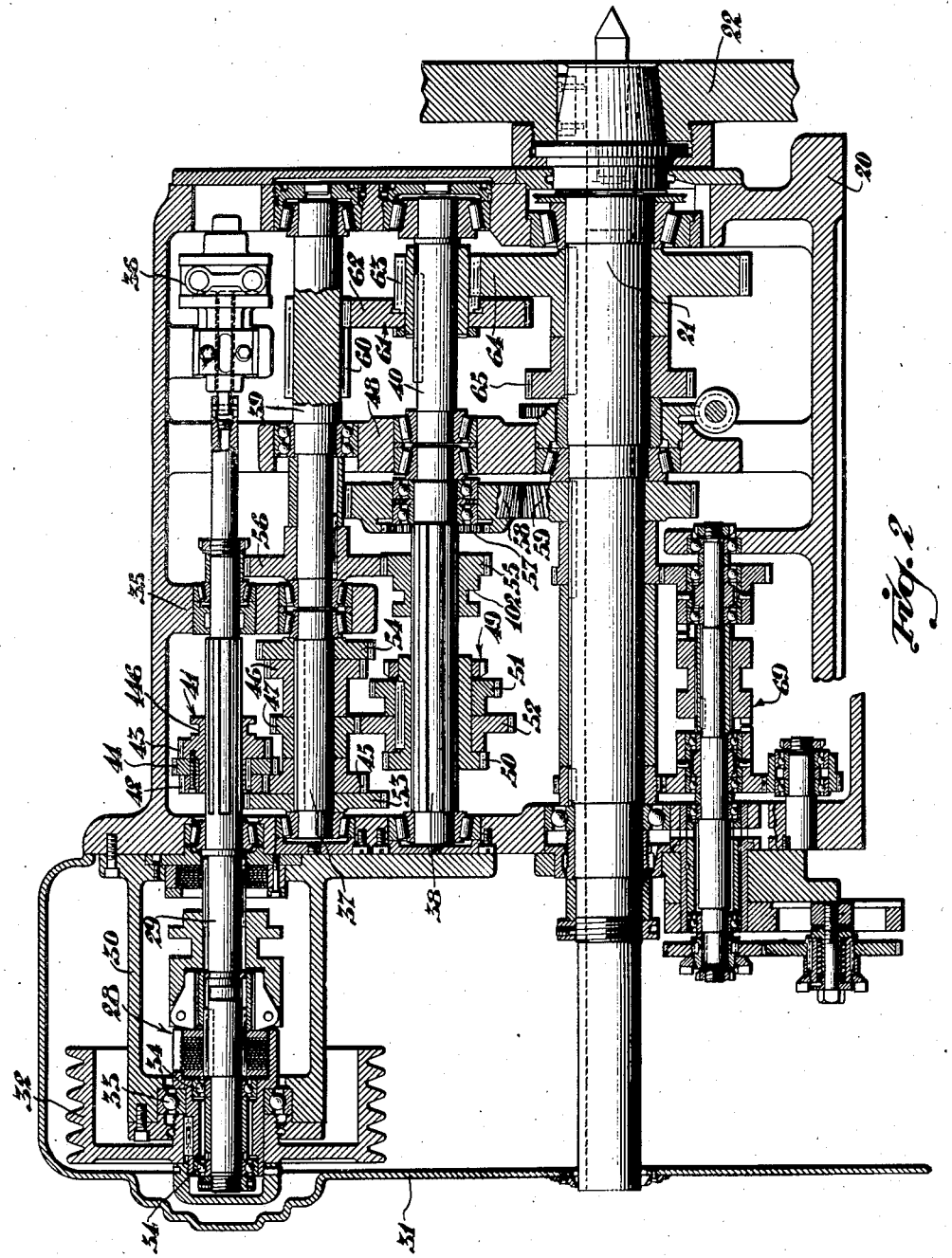

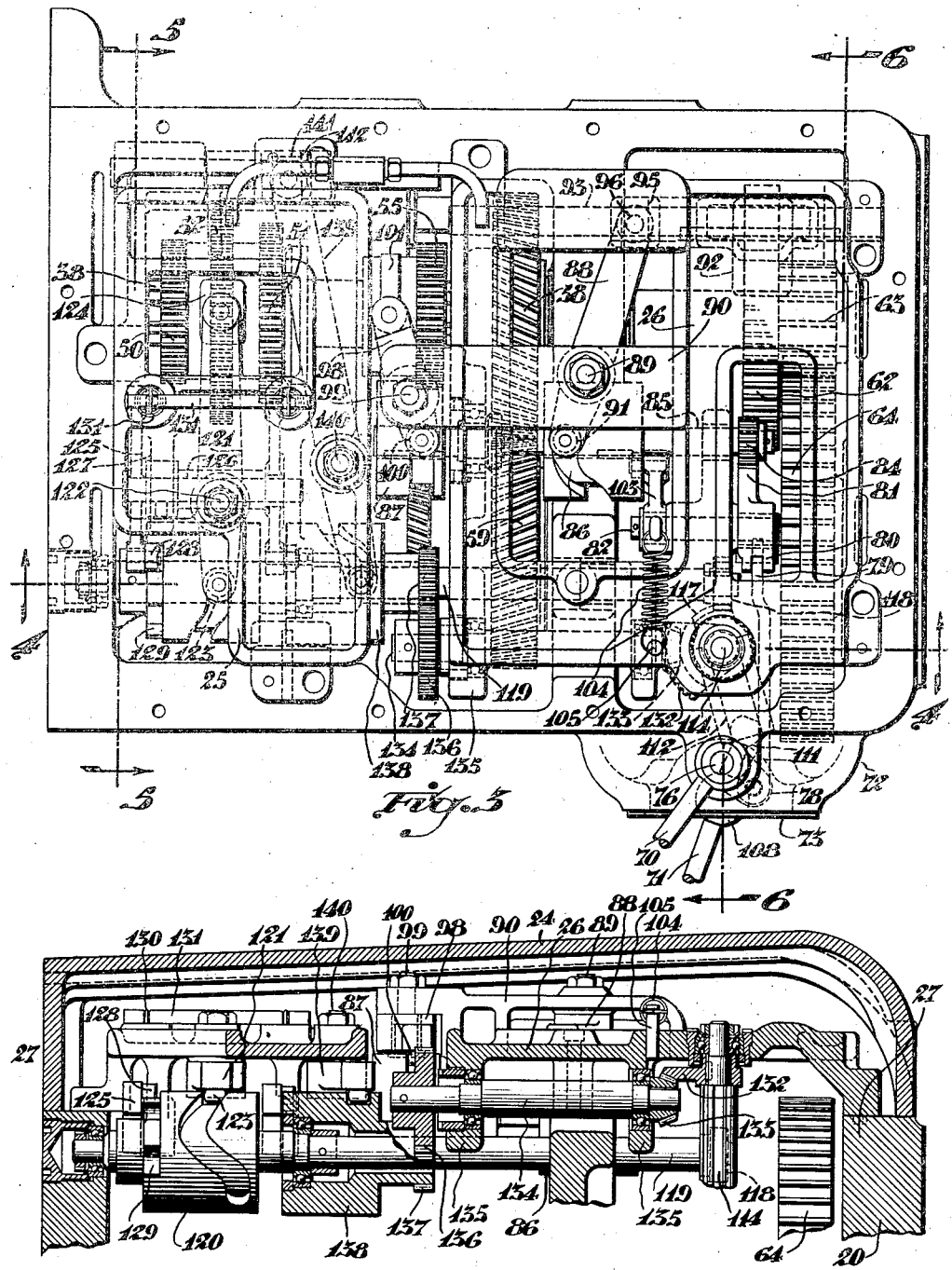

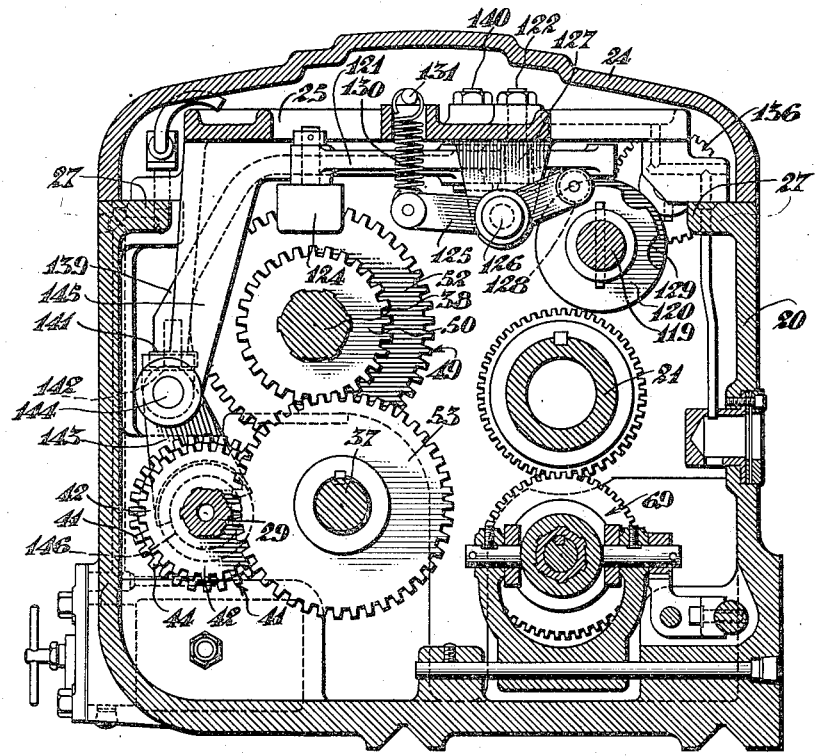

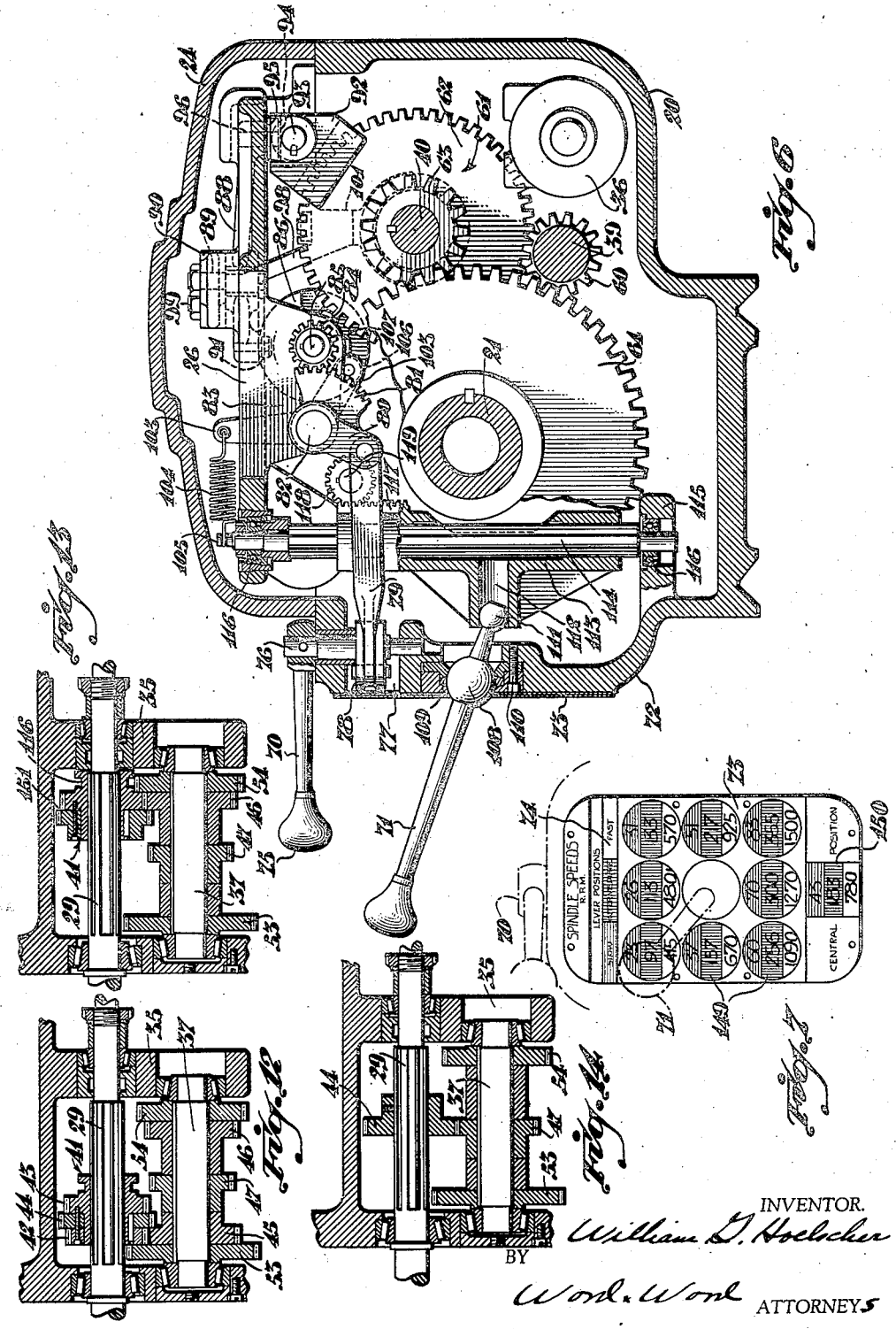

Patented Oct. 19, 1943

2,332,381

UNITED STATES PATENT OFFICE 2,332,381

LATHE SPINDLE SPEED CONTROL

William G. Hoelscher, Cincinnati, Ohio, assignor to The American Tool Works Company, Cincinnati, Ohio, a corporation of Ohio Application November 23, 1940, Serial No. 366,893

6 Claims. (Cl. 74—337.5)

This invention relates to machine tools and is particularly directed to improvements in the headstock of a lathe. More particularly, the improvements are concerned with the transmission contained within the headstock for driving the lathe spindle.

It has been the object of the present inventor to provide an improved speed change transmission including an efficient, simplified arrangement of gearing extending from the driving pulley to the spindle, in which the gear arrangement may be easily modified to be capable of providing different ranges of speeds, for example, nine, eighteen, or twenty-seven speeds. The arrangement of shafts and gearing is such that the builder or manufacturer of the lathe may produce a standard headstock and may alter this headstock to change the range afforded thereby, merely by altering the gear set-up adjacent the power input end of the transmission; that is, adjacent the clutch and driving pulley.

It has been a further object of the present inventor to provide an improved gear-shifting arrangement wherein a range control lever is provided for shifting to any one of a plurality of speed ranges and a speed change lever is provided for changing to speeds within the ranges. These levers are associated with an indicator plate at the front of the lathe in such manner that the speed changes can be read directly and with absolute ease.

It has been a further object of this inventor to provide a lever and cam means for gear shifting by means of a lever having a compound motion; that is, movable either vertically or horizontally. The lever is effective in the respective directions for actuating a cam in each instance for producing the appropriate gear changes. The shifting levers are arranged and supported within the headstock casing so as to make it possible to move the gears with very little manual effort.

Other objects and certain advantages of this invention will be more fully apparent from the description of the drawings in which:

Figure 2 is a sectional view taken longitudinally through the headstock with the shafts spread out in the same plane for illustrating the gear train.

Figure 3 is a top plan view of the headstock generally, with the top cover removed.

Figure 4 is a fragmentary sectional view taken on line 4—4, Figure 3, detailing a portion of the shifting mechanism.

Figure 5 is a sectional view taken on line 5—5, Figure 3, further illustrating the gear-shifting mechanism.

Figure 6 is a sectional view taken on line 6—6, Figure 3, illustrating the shifting lever assembly and the means extended therefrom for shifting the gears.

Figure 7 is an enlarged detailed view of the speed indicator plate, appearing in Figure 1.

Figure 1:
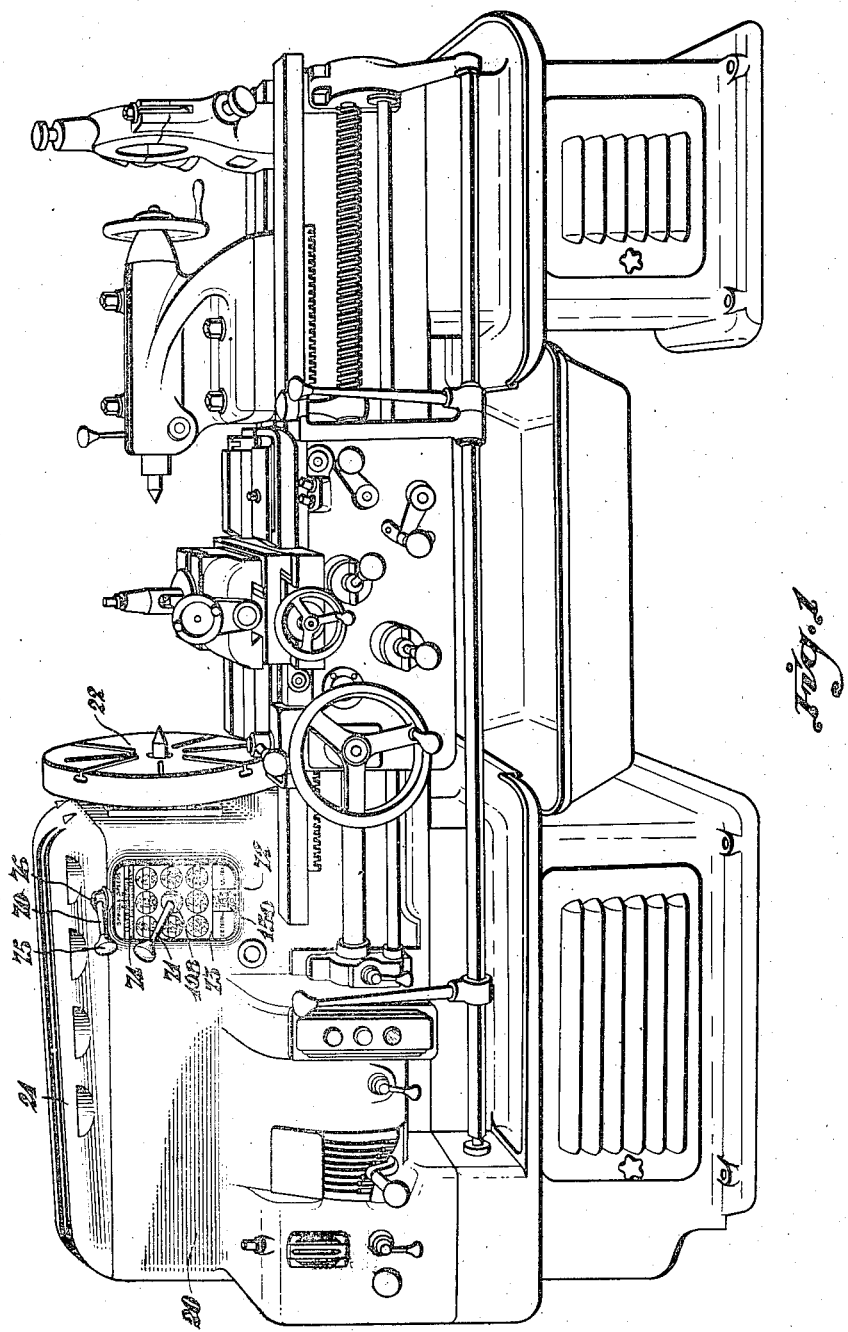
Figure 1 is a general perspective view illustrating a lathe incorporating the improved headstock construction of this invention.

Figures 8 to 11 inclusive are layout views illustrating the several shifting cams.

Figure 12 is a fragmentary sectional view taken from Figure 2 showing the sub-assembly of gears for procuring twenty-seven speeds.

Figure 13 is a view taken similar to Figure 12 illustrating the gear arrangement for procuring eighteen speeds.

Figure 14 is a view taken similar to Figure 12 illustrating the gear arrangement for procuring nine speeds.

As explained heretofore, it is one of the purposes of this inventor to provide an assembly of gears and mechanism in the headstock whereby the headstock, by very little variation, may be supplied as a nine-speed, eighteen-speed, or twenty-seven-speed headstock. By the simple procedure of removing the first of component gears or gear clusters from the gear train and replacing them with the appropriate gears, the speed capacity of the transmission is varied. These changes are made adjacent the clutch and on what may be referred to as the power supply shaft and a short, easily removable countershaft.

The gears are shifted mechanically by means of cams and levers compactly arranged and mounted within the casing. Control of these shifting mediums is accomplished by means of a lever assembly at the front of the headstock. One of the levers shifts the gears into high, low, and intermediate ranges, and the other lever varies the speeds within the respective ranges. The plate provides a series of colored panels, and by virtue of the color arrangement and the position of the manipulating ends of the levers, the operator is able to ascertain immediately the speed to which the mechanism has been set. One of the levers has a compound movement; that is to say, a movement which will permit the lever to be moved either vertically or horizontally for moving the same into position registering with any one of horizontally and vertically arranged panels indicating the speeds within the various ranges.

Described in more detail, the transmission comprises a headstock casing 20 in which a spindle 21 is mounted. A face plate 22 may be used as shown in Figure 1. A cover 24 is provided to permit access to the mechanism, particularly the gear shifting mechanism which is suspended from brackets 25—26 mounted on a flange 27 projected inwardly from the upper portion of the headstock casing. A clutch 28 (Figure 2) controls the supply of power for the power supply shaft 29. This clutch is contained within a clutch casing 30 fixed to the end of the headstock casing. A dust cover 31 covers the clutch and drive assembly as well as certain other mechanism associated with the headstock. A pulley 32 driven by V-type belts is journalled in ball bearing 33 in the clutch casing. It is not believed necessary to describe the clutch and drive pulley assembly in detail since this portion of the mechanism is not a part of the present invention.

The drive shaft 29 is journalled in bearings 34—34 in the drive pulley and an inner cross wall 35 of the headstock casing. This drive shaft drives the lubricant pump 36 in the conventional manner. Intermediate or countershafts 37 to 40 inclusive are provided in the present arrangement, intermediate the drive shaft and the spindle 21. That portion of the drive shaft 29 between the end wall and the cross wall 35 is splined. The twenty-seven-speed arrangement is illustrated in the main view, Figure 2. A gear cluster 41 is slidably mounted on the splined portion of the drive shaft. This cluster 41 includes three gears 42, 43, and 44 listed in the order of their sizes. A set of gears is fixed on the countershaft 37 journalled between the end wall and the cross wall 35. Gears 45, 46, and 47, component to the gears 42, 43, and 44, are included. Thus, it is possible to deliver three speeds to the shaft 37.

The next countershaft 38 is mounted in ball bearings in the outer end wall of the headstock casing and in intermediate wall 48. A portion of this shaft is splined. A gear cluster 49 is slidably mounted on the splined portion and includes three gears 50, 51, and 52, listed in the order of their sizes. The set of gears included on the shaft 37 includes gears 53 and 54. In addition to the gears already mentioned, these gears 53, 54, and a previously-mentioned gear 47 are component to the gears 50, 51, and 52. Thus, nine speeds may be delivered to the shaft 38.

From this shaft 38, the drive may proceed either directly to the spindle or by way of the countershafts 39, 40. In order to accomplish this, a gear 55 is shiftably mounted on the splined portion of the shaft 38 and meshes either with the gear 56 keyed to the shaft 39 or with the internal gear portion 57 of a gear 58, loosely mounted on a plain portion of the shaft 38 directly adjacent the wall 48. The gear 58 is helical and in mesh with helical gear 59 keyed to the spindle 21. The spindle 21 is mounted in the end walls and intermediate wall 48 of the headstock casing in roller bearings. Thus, nine speeds may be imparted to the spindle by way of gears 58 and 59.

The shaft 39 is journalled in bearings in the interior walls 35 and 48 and the end wall of the headstock casing. A long gear 60 is formed as part of the countershaft 39 between the interior wall 48 and the inner end wall of the headstock casing. A gear cluster 61 is in splined connection with the countershaft 40 journalled in and between the interior wall 48 and the inner end wall of the headstock casing in alignment with the countershaft 38. The cluster 61 may be slid back and forth with its gear 62 in mesh with the gear 60 at all times. The gear 63 of cluster 61 is adapted to mesh with the gear 64 keyed on the spindle. Gear 62 is adapted to mesh with the gear 65 keyed to the spindle. Since the shaft 39 may be driven at nine different speeds, it is obvious that the spindle may be driven at eighteen speeds through this gear set just described. With the preceding range of nine speeds, it is then obvious that the spindle be driven at any one of twenty-seven different speeds.

The feed box gearing driven from the spindle in the usual manner is indicated generally at 69. No description of this is included since it does not constitute a part of this invention.

*Shifting mechanism*

The range control lever 70 and the speed control lever 71 are mounted in the forward wall of the headstock casing. The headstock casing includes a bulge 72 upon the face of which the indicator plate 73 is mounted. The lever 71 is mounted at the center of the plate and is adapted to be moved either vertically or horizontally about an axis for registering with vertically and horizontally disposed rows of insignia on the face of the indicator plate. The range control lever 70 swings horizontally to any one of three positions: namely, slow, intermediate and fast, indicated at 74 on the panel. The color, blue indicates slow; red indicates intermediate; and black indicates fast. The manipulating knob 75 of the range control lever is adapted to be disposed over and register with any one of the respective panels 74.

The lever 70 is fixed to a vertically mounted shaft 76. This shaft is mounted in the bulge portion of the headstock casing and is disposed across a clearance slot 77. The bulge provides a flat horizontal surface affording a bearing for the underside of the lever 70 in its swinging movements. A bifurcated arm 78 is fixed to the shaft 76 within the slot. A link 79 connects the bifurcated arm to the arm 80 of the gear segment 81 fixed on a stub shaft 82 journalled in a depending lug 83 of the bracket 26. The gear segment meshes with a spur gear 84 fixed on the end of a shaft 85 (Figures 3 and 6), journalled in depending flanges of the bracket 26.

Cams 86—87 are fixed on this shaft and include the usual cam tracks configurated to shift the gear 55 and gear cluster 61 to produce the three-speed ranges. A shifting lever 88 is pivotally mounted on the bracket 26 on a vertical pivot pin 89 (Figures 3 and 6). This pivot pin is mounted in a cross member 90 of the bracket 26. One end of the lever includes a roller 91 engaged in the cam track of the cam 86 and the other end is connected to a shifting yoke 92 straddling the gear 62 of the gear cluster 61. The yoke is slidably mounted on a rod 93.

One end of the hub of the yoke includes a transverse slot 94 in its upper surface. A rectangular block 95 is engaged in the slot. This block is rotatably mounted on a pin portion 96 in the end of the lever 88. Thus, swinging movement of the lever 88, as produced by the cam track, slides the yoke along the rod 93, with which it is in splined connection. This action moves the gear 62 to position of mesh with gear 65 or moves the gear 63 to position of mesh with the gear 64.

The other cam 87 actuates a lever 98, also fulcrumed or mounted for swinging movement on the cross member of the bracket 26 on a pin 99. One end of this lever 98 includes a roller 100 disposed in the cam track of the cam 87. The other end extends down from the pivot and carries a pivotally mounted yoke 101 disposed in the groove 102 of the gear 55. The cam track is configurated to move the gear 55 to position of mesh either with the gear 56 or with the internal gear portion 57 of gear 58.

Thus, the combined effect of the two cams is to produce three speed ranges. When the gear 55 is in mesh with the gear 56, the gear cluster 61 is actuated. In one position, it causes its gear 62 to mesh with gear 65 and in the other, gear 63 to mesh with gear 64. These gears produce high and low speed ranges. When the gear 55 is moved into mesh with the internal gear portion 57 of gear 58, intermediate speed results through direct connection to the spindle.

A detent means is provided, causing the cams 86, 87 to register accurately at the three range position. As shown in Figures 3 and 6, the detent consists of a bell crank 103 pivotally mounted on the stub shaft 82. One arm of the bell crank is connected, by means of a coil spring 104 under tension, to a pin 105 mounted in the bracket 26. The other arm of the bell crank is thus swung or urged upwardly at all times for causing its roller 106 to yieldably register with any one of three detent grooves 107 around the margin of one end face of the cam 86.

As stated heretofore, the other lever; that is, the speed control lever 71 is mounted for universal movement. For this purpose, it includes a ball portion 108 intermediate its ends. This ball portion is journalled in a bushing or packing unit 109 secured in a bore in the bulge portion of the headstock casing by means of screws 110. The coupled end of the handle or lever 71 consists of a ball 111 fitted into the horizontal bore 112 of a rotatably and translatably mounted shifting element 113. The shifter 113 is mounted in splined connection on the vertical shaft 114. The shaft 114 is mounted in ball bearings 116. The lower ball bearing is contained in a boss 115 and the upper in one end of the bracket 26. The shifter includes a rack 117 formed longitudinally and vertically thereof. This rack is in mesh with a gear 118 fastened to one end of a cam shaft 119. The shaft 119 (Figure 4) is journalled in the interior wall 48 of the casing at one end and at the other end is journalled in a ball bearing in the outer end wall of the headstock casing.

The cam 120 is fixed to the shaft 119 toward the outer end wall of the headstock casing. This cam 120 includes a cam track configurated and arranged to actuate a lever 121 for shifting the gear cluster 49 to any one of three positions, either meshing gears 50—53, gears 51—54, or gears 52—47. The lever 121 is fulcrumed on a pin 122 vertically fixed in the bracket 25. One end of the lever includes a roller 123 engaging the cam track, and the other end carries a pivotally mounted yoke 124 straddling the gear 52 of the gear cluster 49.

A detent device is provided for registering this cam at any one of the three positions. This device includes a bell crank 125 mounted on a pin 126 supported in a lug 127 depending from the underside of the bracket 25. One end of the bell crank includes a roller 128 engageable with any one of three detent grooves 129 around the end portion of the cam. A coil spring 130, under tension between the other end of the bell crank and a rod 131, supported across the top of the bracket, hold the detent in operative position under tension. The spring extends upwardly through an aperture in the bracket, and its terminal end lies in a circumferential groove in the rod 131.

Referring back to the shaft 114, which is best shown in Figures 4 and 6, it will be noted that this shaft includes a bevel gear segment 132 fixed to its upper end and meshing with a bevel gear 133 fixed to the end of a shaft 134 mounted in lugs 135 depending from the bracket 26. A gear 136 is pinned to the other end of this shaft and meshes with a gear 137 formed as a part of the cam 138.

The cam 138 actuates, through its cam track, a lever 139. This lever is fulcrumed on the pin 140 and is thus suspended from the bracket 25. The lever projects downwardly (Figure 5) and includes a pivotally mounted block 141 engaged in a slot 142 in the hub of the yoke 143. This yoke is slidably mounted on a rod 144 mounted in a depending lug 145 of the bracket 25. The yoke engages a groove 146 of the gear cluster 41. The cam track is configurated to move the gear cluster 41 to any one of the three positions whereby any one of the sets of gears, 42—45, 43—46, or 44—47 are caused to mesh. A detent device, similar to the one on cam 120 is provided for registering this cam 138 in any one of its three positions. The cam tracks of the respective cams are co-related so as to cause these shifts in the correct sequence and in accordance with the position of the lever 71 relative to the dial. It will be observed that as the lever 71 is swung laterally, the cam 138 is operated, and as the lever is swung vertically, the cam 120 is operated.

Indicator plate

Referring to the plate, detailed in Figure 7, it will be noted that a panel 149 of three speeds is provided for each position of the lever 71. The color scheme shown at 74 is utilized on each panel; that is to say, the horizontal stripes reading from the top down are blue, red, and black, with the appropriate speed indicated on each. When the range control lever 70 is in, let us say, slow speed, which is indicated at blue, the operator reads the blue stripe of the particular panel with which the knob of the lever 71 registers. Since the lever 71 is universally mounted in the center of the panel, it is obvious that the central or directly outward position of the lever could not be indicated on the center of the panel. This particular panel is moved down to the bottom of the panel and is indicated at 150.

Speed range varying means

As illustrated in Figures 12 to 14 inclusive, and as described heretofore, it is possible to change the headstock to convert it either into a nine-, eighteen-, or twenty-seven-speed transmission. The changes are made on the shafts 29 and 37. The gear cluster 41 may either contain three gears (Figure 12) or two, as shown at 151 (Figure 13) or may be a single gear 44 (Figure 14). The assembly on shaft 37 is altered to leave out the component gears omitted from the cluster. These changes can be made very readily at the outer end of the transmission by removing the clutch assembly and pulling the shafts 29 and 37. It will be noted that the shaft 37 is a short section of shafting conveniently removed and reassembled.

The gears 42, 44 are separately removable from the gear 43 and the gears 45, 46, and 47 are separately removable. Accordingly, any one of these gears can be included or left out depending on the range of speeds desired in the finished headstock. Thus, the manufacturer can stock a standard headstock casing construction and convert it to either one of the three speed ranges by simply altering the gear set or assembly adjacent the clutch as described heretofore.

Having describe my invention, I claim:

1. In a lathe headstock including a spindle and a speed change gear transmission for driving the spindle, cams for shifting certain of the gears, a shaft supporting said cams, one of said cams fixed to the shaft and the other loosely mounted thereon, a control lever mounted for universal movement, a slidably rotatably mounted shifting element, means connecting the shifting element and the lever, means connecting the shifting element and the shaft for rotating said shaft and said fixed cam directly, and means between the shifting element and the other cam for rotating said other cam on the shaft, and shifting levers connecting the respective cams to respective gears.

2. In a lathe headstock including a spindle and a speed change gear transmission for driving the spindle, cams for shifting certain of the gears, a shaft supporting said cams, one of said cams fixed to the shaft and the other loosely mounted thereon, a control lever mounted for either horizontal or vertical movement, a slidably rotatably mounted shifting element, means connecting the shifting element and the lever, rack and gear means connecting the sthifting element and the shaft for rotating said shaft and said fixed cam directly, and rotative means between the shifting element and the other cam for rotating said other cam on the shaft.

3. In a lathe headstock including a spindle and a speed change gear transmission for driving the spindle, cams for shifting certain of the gears, a shaft supporting said cams, one of said cams fixed to the shaft and the other loosely mounted thereon, a control lever mounted for universal movement, a slidably rotatably mounted shifting element, means connecting the shifting element and the lever for either rotating or slidably moving said shifting element, one of said cams connected to said shifting element for rotation by lineal movement thereof and the other cam connected for rotation by rotative movement thereof.

4. In a lathe headstock including a spindle and a speed change gearing for driving the same; cams and levers for shifting certain of the gears, a horizontally movable lever, a vertically mounted shaft rotated by said lever, means coupling the shaft to certain of the cams for rotating the same, a second lever mounted just below the first and adapted to be moved horizontally and vertically, a shifting element, said lever flexibly connected to said shifting element, a vertically mounted shaft, said element being mounted in splined shiftable engagement with said shaft, a second shaft, a cam loosely mounted on said second shaft and a cam fixed thereon, respective levers extending from said cams to said gears for shifting the same, a gear on the second shaft, a rack on the shifting element engaging the gear for rotating the shaft when the element is moved longitudinally along the splined shaft, a gear engaging the loosely mounted cam, and a connection from the splined shaft to said last-named gear for rotating the second cam when the splined shaft is rotated through the shifting element.

5. In a lathe headstock including a spindle and a speed change gearing for driving the same; cams and levers for shifting certain of the gears, a horizontally movable lever for controlling speed ranges, a vertically mounted shaft actuated by said lever, means coupling the shaft to certain of the cams for rotating the same to change speed ranges, a second lever mounted just below the first and adapted to be moved horizontally and vertically for shifting gears and effecting further speed changes within the speed ranges, an axially and rotatively shiftable element, said second lever flexibly connected to said shiftable element, cams, respective levers extending from said cams to certain of said gears for shifting the same, and coupling means connecting said last-named cams for rotating one when the shiftable element is rotated and rotating the other when the shiftable element is moved axially.

6. In a lathe headstock including a spindle and a speed change gearing for driving the same; cams and levers for shifting certain of the gears, a horizontally movable lever for changing speed ranges, a vertically mounted shaft actuated by said lever, means coupling the shaft to certain of the cams for rotating the cams to change speed ranges, a second lever mounted just below the first and having universal movement for shifting gearing and effecting various speed changes within said speed ranges, a shiftable element actuated by said second lever, cams and levers for shifting certain others of said gears, means connecting the cams and said shiftable element, and coupling means extended from the second lever to the respective cams for operating one when the shiftable element is moved in one direction and operating the other when the shiftable element is moved in another direction.

WILLIAM G. HOELSCHER.